Dec. 13, 1927.
F. R. EAGLESFIELD
SEAT MOLDING
Filed Jan. 24, 1927
1,652,302
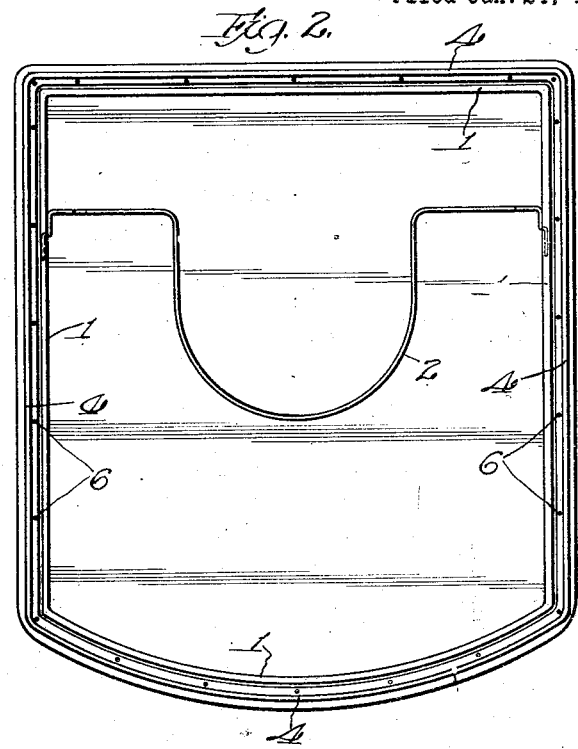
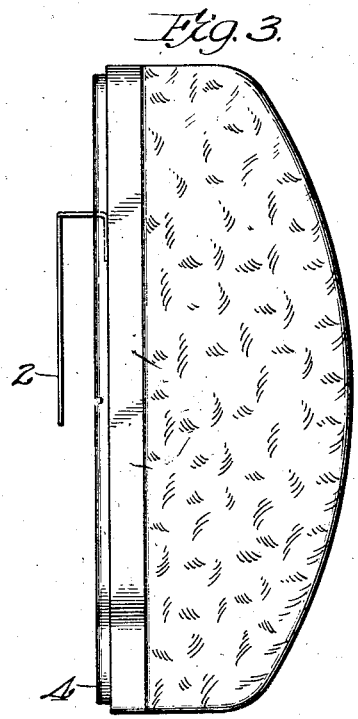
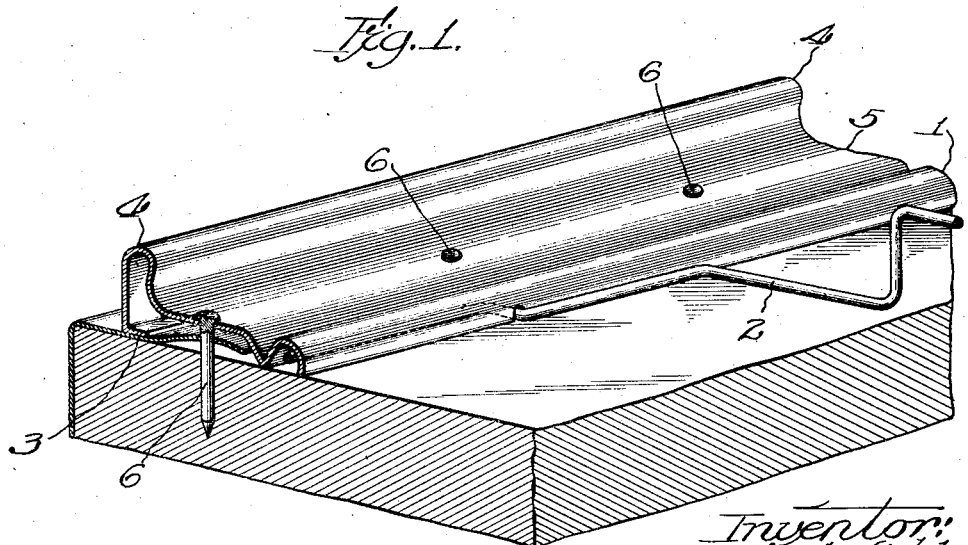
Inventor:
Frederick R. Eaglesfield
By: Wallace R. Lane
Atty.

Patented Dec. 13, 1927.

1,652,302

UNITED STATES PATENT OFFICE.

FREDERICK R. EAGLESFIELD, OF NILES, MICHIGAN, ASSIGNOR TO THE KAWNEER COMPANY, OF NILES, MICHIGAN, A CORPORATION OF MICHIGAN.

SEAT MOLDING.

Application filed January 24, 1927. Serial No. 162,986.

This invention is especially useful in the furnishing of metal seat moldings for theater chairs where the molding may be applied to the under side of a seat to hold the fabric and simultaneously hold the usual wire hat rack.

One of the objects of this invention is to provide a seat molding which may be made of metal or other suitable material and which may be used to cover the edges of the seat fabric on the under side of chairs, particularly theater chairs.

Another object of this invention is to provide a seat molding to cover the exposed edges of the seat fabric and which is also adapted to retain a wire hat rack in operative position.

Another object of this invention is to provide a seat molding which will cover the edges of the seat fabric, retain a wire hat rack in operative position, and which is so formed as to be resiliently clamped against the seat and which also is so formed as to constitute a convenient hand grip for raising the seat.

Further objects, advantages and capabilities will later more fully appear and are inherently possessed by the invention.

While I have shown in the accompanying drawing a preferred embodiment of this invention, it should be understood that the same is susceptible of modification and change without departing from the spirit of my invention.

Referring to the drawings, Fig. 1 is a perspective view of a section of a seat showing the molding in perspective.

Fig. 2 is a plan view of the bottom of a seat showing the molding in place and so retaining a hat rack.

Fig. 3 is an end elevation of the seat shown in Fig. 2.

Referring now in greater detail to the drawing, a portion of the molding is formed with a portion having a channel 1 extending parallel to the edge of the seat and adapted to retain, as illustrated in Fig. 1, the wire hat rack 2. The manner of gripping the ends of the hat rack may, of course, be varied, the channel disclosed being the preferred construction.

The opposite edge of the molding is fashioned as at 3 to frictionally engage with the edge of seat fabric used for covering the seat. In accordance with the disclosure of Fig. 1, the edge of the seat fabric is not only engaged frictionally and held in place, but the edges of the fabric which would otherwise be exposed are covered by the entire molding. The resilient shoulder 4 serves as a convenient hand grip for raising the seat and also serves as the means thru which pressure may be resiliently exerted to hold the portion 3 in engagement with the seat fabric.

In order that the molding may be fastened to the seat and so that the channel 1 and the edge 3 may be held in operative position, the resilient portion 5 is connected to the seat by means of nails 6 or other suitable connecting means. The resilience of the portion 5 provides adequate pressure for the above purposes.

It is contemplated that this molding may be made of metal which will have the resilient characteristics desired or the molding may be made of other suitable material.

Having shown and described my invention,

I claim:

1. A seat molding comprising means for retaining a wire hat rack in operative position against a seat, means for frictionally retaining seat fabric on the seat, and means for resiliently holding the first two said means in their operative positions on the seat.

2. A seat molding comprising a portion adapted to cover and engage an edge of a seat fabric on a seat, another portion adapted to retain a wire hat rack in operative position, a resilient portion between the first two said portions, and means for connecting said resilient portion to the seat to yieldingly urge the first two said portions toward the seat.

3. A seat molding having a channel for retaining the ends of a wire hat rack and having means for yieldingly clamping a seat fabric against a seat.

4. A seat molding comprising means for retaining a hat rack in operative position, a portion adapted to cover and engage an edge of a seat fabric on a seat and adapted to serve as a convenient hand grip, and means for resiliently retaining the first said means and said portion in operative position on the seat.

5. A seat molding comprising a portion having a channel for retaining a hat rack in operative position, a portion adapted to urge a seat fabric against a seat surface, means for connecting the molding to the seat to yieldingly retain said portions in operative position, and a resilient projecting shoulder on the said second portion connecting it to said means.

In witness whereof, I hereunto subscribe my name to this specification.

FREDERICK R. EAGLESFIELD.